(12) United States Patent
Avadhanam et al.

(10) Patent No.: US 12,157,503 B2
(45) Date of Patent: Dec. 3, 2024

(54) DEFINING DRIVING ENVELOPE FOR ASSISTED-DRIVING SYSTEM

(71) Applicant: Atieva, Inc., Newark, CA (US)

(72) Inventors: Sharath Avadhanam, Milpitas, CA (US); Tor Aksel Notland Heirung, Oakland, CA (US); Jinwoo Lee, Fremont, CA (US)

(73) Assignee: Atieva, Inc., Newark, CA (US)

( * ) Notice: Subject to any disclaimer, the term of this patent is extended or adjusted under 35 U.S.C. 154(b) by 644 days.

(21) Appl. No.: 16/949,158

(22) Filed: Oct. 15, 2020

(65) Prior Publication Data

US 2022/0119004 A1    Apr. 21, 2022

(51) Int. Cl.
*B60W 60/00* (2020.01)
*B60W 30/00* (2006.01)
*B60W 50/14* (2020.01)
*G06F 18/25* (2023.01)
*G06N 20/00* (2019.01)
(Continued)

(52) U.S. Cl.
CPC .......... *B60W 60/005* (2020.02); *B60W 30/00* (2013.01); *B60W 50/14* (2013.01); *G06F 18/25* (2023.01); *G06N 20/00* (2019.01); *G06V 20/597* (2022.01); *G08G 1/22* (2013.01); *B60W 2420/403* (2013.01); *B60W 2420/408* (2024.01); *B60W 2420/54* (2013.01);
(Continued)

(58) Field of Classification Search
CPC .... B60W 60/005; B60W 30/00; B60W 50/14; B60W 2420/42; B60W 2420/52; B60W 2420/54; B60W 2520/10; B60W 2554/80; B60W 2556/65; B60W 2420/403; B60W 2420/408; G06K 9/6288; G06N 20/00; G06V 20/597; G08G 1/22; G06F 18/25
See application file for complete search history.

(56) References Cited

U.S. PATENT DOCUMENTS 9,008,890 B1 * 4/2015 Herbach ................ G07C 5/008
340/436
9,308,915 B2   4/2016 Huth et al.
(Continued)

FOREIGN PATENT DOCUMENTS

| DE | 102018001003 A1 | 8/2018 |
| DE | 102018207023 A1 | 11/2019 |
| EP | 3620881 A1 | 3/2020 |

OTHER PUBLICATIONS

SAE International: "Surface Vehicle Recommended Practice, Taxonomy and Definitions for Terms Related to Driving Automation Systems for On-Road Motor Vehicles," J3016, Jun. 2018, 35 pages.
(Continued)

*Primary Examiner* — Hunter B Lonsberry
*Assistant Examiner* — Harrison Heflin
(74) *Attorney, Agent, or Firm* — Brake Hughes Bellermann LLP

(57) ABSTRACT

A computer-implemented method comprising: receiving sensor data from sensors of a first vehicle associated with a first person, the sensor data generated by the sensors; applying a machine-learning algorithm to the sensor data to define a driving envelope for an assisted-driving system, the assisted-driving system installed in a second vehicle; and providing the driving envelope to the assisted-driving system installed in the second vehicle.

23 Claims, 12 Drawing Sheets

(51) Int. Cl.
*G06V 20/59* (2022.01)
*G08G 1/00* (2006.01)

(52) U.S. Cl.
CPC ..... *B60W 2520/10* (2013.01); *B60W 2554/80* (2020.02); *B60W 2556/65* (2020.02)

(56) References Cited

U.S. PATENT DOCUMENTS

| | | | |
|---|---|---|---|
| 10,481,613 B2 | 11/2019 | Schroeder et al. | |
| 2017/0174221 A1* | 6/2017 | Vaughn | G05D 1/0221 |
| 2017/0313320 A1* | 11/2017 | Asakura | B60W 60/00136 |
| 2018/0004211 A1* | 1/2018 | Grimm | G06Q 50/28 |
| 2018/0365740 A1* | 12/2018 | Nix | B60W 50/08 |
| 2019/0039545 A1* | 2/2019 | Kumar | G07C 5/008 |
| 2019/0047584 A1* | 2/2019 | Donnelly | B60W 30/025 |
| 2019/0220028 A1* | 7/2019 | Anderson | G06N 3/0454 |
| 2019/0278297 A1* | 9/2019 | Averhart | G01C 21/3658 |
| 2022/0028293 A1* | 1/2022 | Urano | G06V 20/58 |
| 2022/0032939 A1* | 2/2022 | Urano | B60W 50/04 |
| 2022/0035371 A1* | 2/2022 | Chan | G05D 1/0061 |
| 2022/0126878 A1* | 4/2022 | Moustafa | B60W 60/0053 |
| 2022/0169265 A1* | 6/2022 | Wu | G07C 5/008 |

OTHER PUBLICATIONS

International Search Report and Written Opinion for PCT Application No. PCT/US2021/071737, mailed on Dec. 23, 2021, 14 pages.

\* cited by examiner

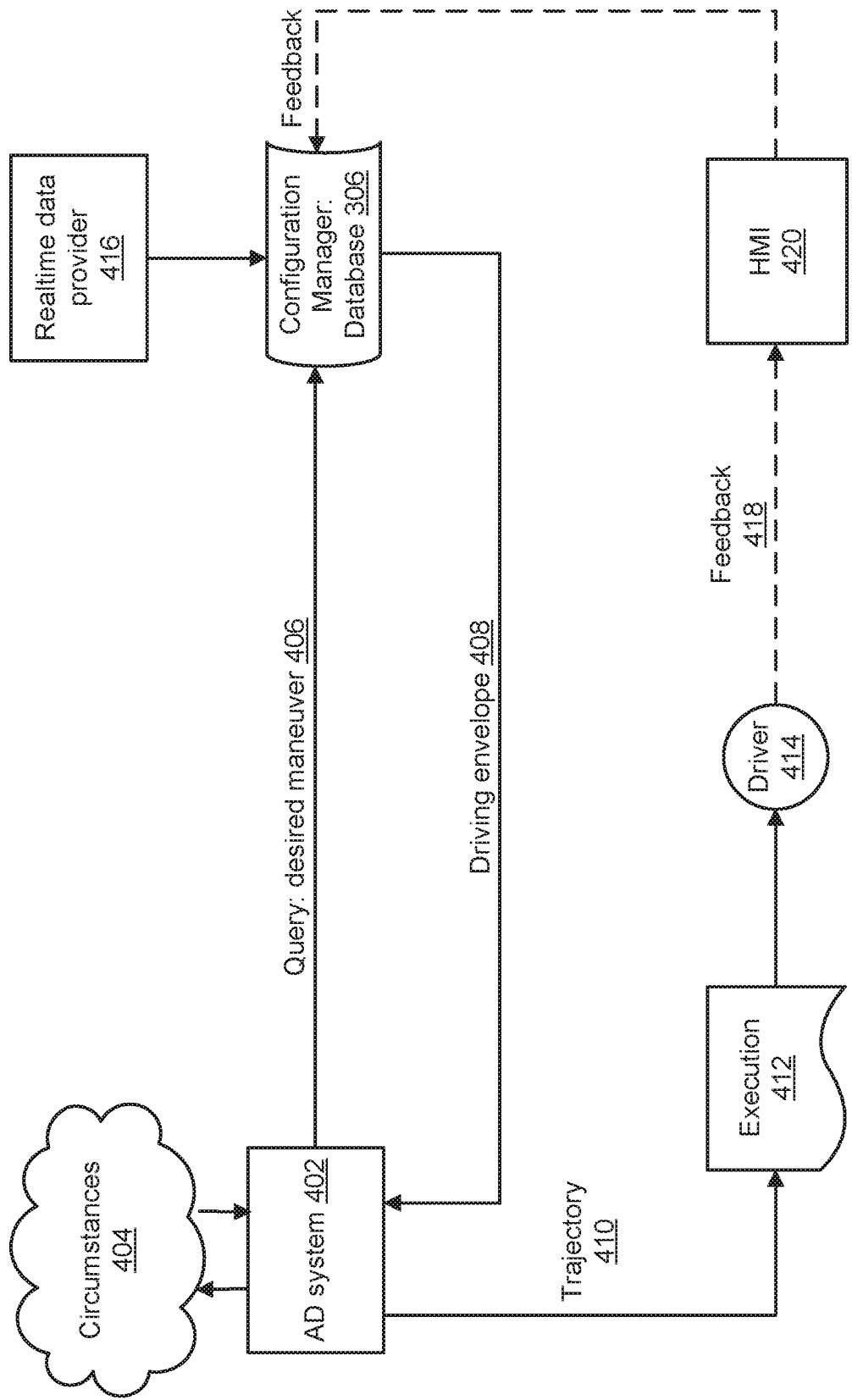

DEFINING DRIVING ENVELOPE FOR ASSISTED-DRIVING SYSTEM

TECHNICAL FIELD

This document relates to defining a driving envelope for an assisted-driving system.

BACKGROUND

Vehicle transportation is ubiquitous in today's society. Large percentages of the population in many countries have a driver license for, or is otherwise competent to handle, one or more sorts of vehicles. While there are many different types of vehicles that can be driven by such individuals, the many drivers also differ from each other in their driving styles. Anyone who travels in traffic may observe the significant variety among drivers in terms of driving skills, driving preferences, and driving practices. No two drivers are exactly alike.

SUMMARY

A computer-implemented method comprising: receiving sensor data from sensors of a first vehicle associated with a first person, the sensor data generated by the sensors; applying a machine-learning algorithm to the sensor data to define a driving envelope for an assisted-driving system, the assisted-driving system installed in a second vehicle; and providing the driving envelope to the assisted-driving system installed in the second vehicle.

Implementations can include any or all of the following features. The assisted-driving system operates using at least one configuration parameter, and wherein the assisted-driving system determines a value for the configuration parameter using the driving envelope. The configuration parameter controls at least one aspect of the assisted-driving system, the aspect including one or more of a distance between the second vehicle and an object, a speed of the second vehicle, a trajectory of the second vehicle, or an acceleration of the second vehicle. Applying the machine-learning algorithm comprises: identifying at least one event in the sensor data; and applying a tag to the identified event. The assisted-driving system is also installed in the first vehicle, and wherein identifying the at least one event further comprises taking into account an autonomous-driving level of operation of the assisted-driving system installed in the first vehicle when the sensor data was generated by the sensors. The assisted-driving system is also installed in the first vehicle, and wherein identifying the at least one event is performed by the assisted-driving system. Identifying the at least one event further comprises taking into account when the first person takes over control of the first vehicle from the assisted-driving system installed in the first vehicle. The computer-implemented method further comprises performing batch-wise updating of the driving envelope based on additional sensor data generated by the sensors over a period of time. The sensor data is received while the first person drives the first vehicle. The sensor data is received while the assisted-driving system at least in part controls the first vehicle, and wherein the sensor data comprises feedback from the first person on the assisted-driving system. The feedback comprises that the first person at least partially takes over control from the assisted-driving system. The feedback comprises input by the first person on the assisted-driving system. The assisted-driving system uses the driving envelope in performing an action with regard to the second vehicle. The computer-implemented method further comprises receiving user feedback from the first person about performance of the action by the assisted-driving system, and updating a value for a configuration parameter of the assisted-driving system based on the user feedback. The user feedback comprises that the first person at least partially takes over control from the assisted-driving system. The computer-implemented method further comprises prompting the first person for the user feedback, wherein the user feedback is received in response to the prompting. The second vehicle is being driven by a second person when the driving envelope is provided to the assisted-driving system installed in the second vehicle. The computer-implemented method further comprises receiving context data regarding the first vehicle, the context data pertaining to the first vehicle when the sensor data is generated by the sensors, the context data including quantitative or qualitative exogenous metrics. The second vehicle is the first vehicle. The assisted-driving system installed in the second vehicle provides a query to a configuration manager, and wherein the driving envelope is provided to the assisted-driving system by the configuration manager in response to the query. The assisted-driving system installed in the second vehicle provides the query to a configuration manager before taking an action with regard to the second vehicle, wherein the driving envelope specifies an aspect of the action. The assisted-driving system installed in the second vehicle determines, before taking the action, whether to provide the query to the configuration manager before taking the action. The assisted-driving system installed in the second vehicle takes into account realtime data about the second vehicle in determining whether to provide the query to the configuration manager before taking the action. The driving envelope is defined so as to increase a likelihood of successful takeover from the assisted-driving system by the first person.

In a second aspect, a computer program product is tangibly embodied in a non-transitory storage medium, the computer program product including instructions that when executed cause a processor to perform operations, the operations comprising: receiving sensor data from sensors of a first vehicle associated with a first person, the sensor data generated by the sensors; applying a machine-learning algorithm to the sensor data to define a driving envelope for an assisted-driving system, the assisted-driving system installed in a second vehicle, the driving envelope defined so as to increase a likelihood of successful takeover from the assisted-driving system by the first person; and providing the driving envelope to the assisted-driving system installed in the second vehicle.

BRIEF DESCRIPTION OF DRAWINGS

FIG. 4 shows a flow chart of an example of a driving envelope being used by an assisted-driving system of a vehicle.

Like reference symbols in the various drawings indicate like elements.

DETAILED DESCRIPTION

Figure 1:
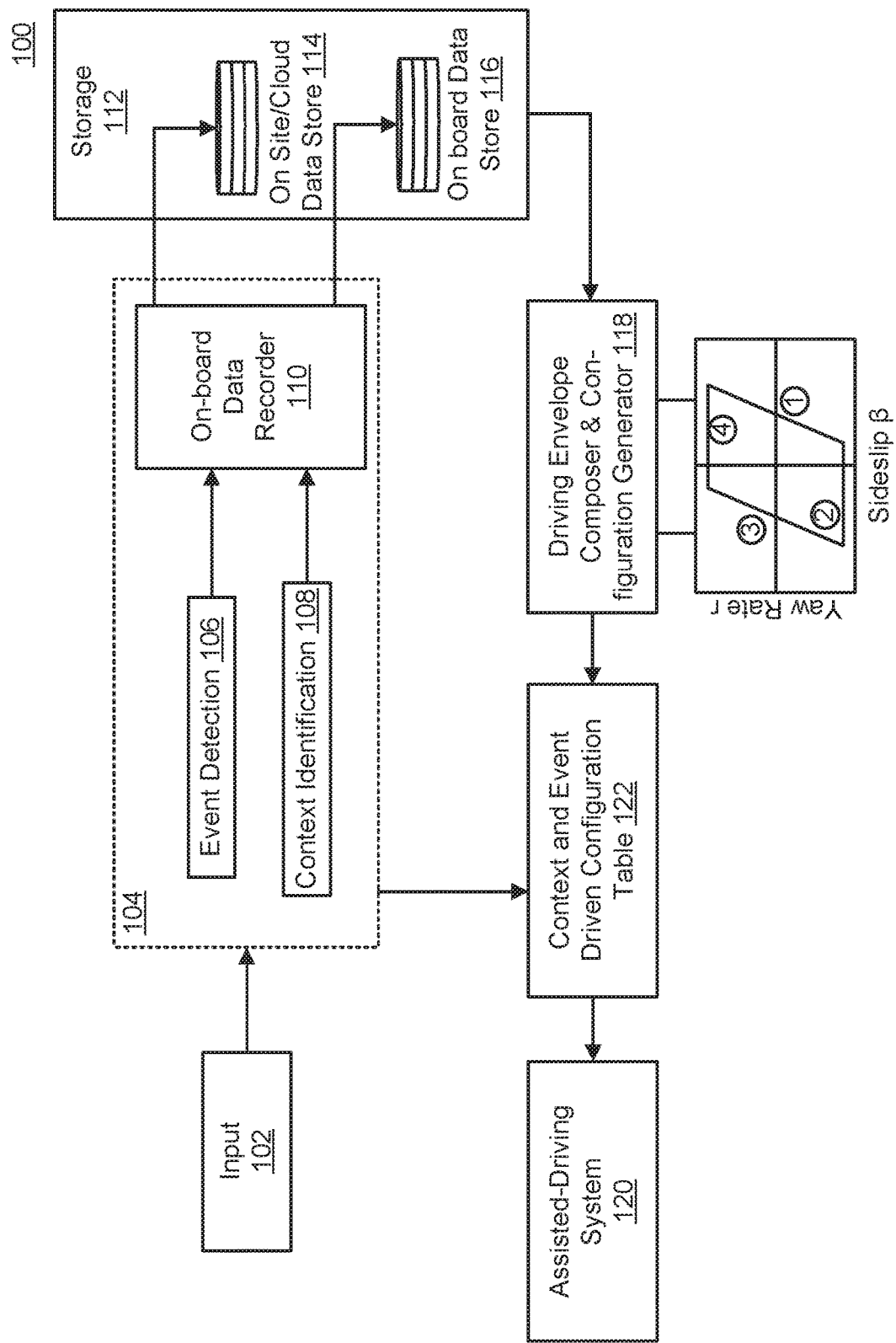
FIG. 1 shows an example of a system that defines a driving envelope.

This document describes examples of systems and techniques for defining a driving envelope for an assisted-driving system. The driving envelope can be defined with an aim of improving safety, for example in situations where the driver is called on to be the fallback for a dynamic driving task or a non-dynamic driving task, such as one being performed by an assisted-driving system. For example, the so-called SAE Level 2 and Level 3 modes are defined in the J3016 classification system published by SAE International and rely upon the driver to take over from the automated system when there is a pending failure thereof. Such and other scenarios are based on the implicit assumption that the driver is then in fact able to take over and retain control of the vehicle, which may not always be a valid assumption. Systems and techniques described herein can infer situations and context for a driving scenario and compute driving envelopes similar or identical to those under which the driver would operate in the absence of automation. Using such driving envelope(s), an assisted-driving system can plan its behaviors and actions in a way that improves the chance (e.g., increases or optimizes the likelihood) that the driver will be successful in taking over control of the vehicle. Moreover, multiple such driving envelopes can be maintained in and made available by a database (e.g., on-board the vehicle or in a cloud), to customize the assisted-driving system for any number of drivers. The present subject matter can be applied to a vehicle operating in any of Levels 1-5 mentioned above.

In some implementations, driver behavior information and relevant contextual information can be collected under different environmental conditions and upon the occurrence of different driving events. This can be based on traffic density; weather conditions; and a driving context being a highway, or an urban or rural environment, to name just a few examples. Accumulation of such data and processing thereof can enable extraction of one or more aspects describing what the driver does (e.g., the speed travelled at, the distance to another object, and/or other factors). The driving envelope can be defined based on at least one aspect extracted from such processed data.

In some implementations, definition of a driving envelope as described herein and use thereof by an assisted-driving system can facilitate at least the following two aspects. First, applying the driving envelope to the assisted-driving system can seek to ensure that the assisted-driving system will not transgress the limit(s) for the situations in which this driver is comfortable or capable of taking over. Second, this can provide that the assisted-driving system operates in a way that makes the person more comfortable during the automated phase. For example, the ride can be made more enjoyable for the person, and/or the experience can confirm to the person that the assisted-driving system is operating safely.

Some implementations can provide one or more advantages. For example, by increasing a likelihood of a successful driver takeover from the assisted-driving system the overall activity of automating some or all vehicle functions can be made safer. User experience and/or the user's trust in the assisted-driving system can be improved. For example, the driver may not be required to customize the assisted-driving system according to his or her personal driving skills, driving preferences, or driving practices. Vehicle design can be simplified. For example, the vehicle designer may not be required to identify and define the system configuration settings (which could run in the number of dozens or hundreds of individually adjustable parameters), or create separate input controls for them.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, the vehicle that is the subject of the example (e.g., the one having an assisted-driving system) is sometimes referred to as the "ego vehicle". One or more other vehicles are sometimes referred to as a "lead vehicle".

Examples herein refer to assisted driving (e.g., as performed by an assisted-driving system). Assisted driving involves at least partially automating one or more dynamic driving tasks. An advanced driver assistance system (ADAS) can perform assisted driving and is an example of an assisted-driving system. Assisted driving is performed based in part on the output of one or more sensors typically positioned on, under, or within the vehicle. While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, an acceleration of the vehicle, or an action that a driver takes with regard to the vehicle. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a vehicle control manipulated by the driver (e.g., a switch, button, slider); a vehicle input control manipulated by a user; a location sensor (e.g., for the vehicle or a component thereof); an orientation sensor (e.g., for the vehicle or a component thereof); a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Examples herein refer to a driving envelope. A driving envelope includes a function or a table or a curve. The driving envelope ties multiple vehicle states together so that the driving envelope can be used for determining or generating one or more values (e.g., a range of values) for at least one configuration parameter of an assisted-driving system. The values can include a configuration parameter and/or a configuration constraint, to name just two examples. The configuration parameter can be defined to control at least one aspect of the assisted-driving system. The driving envelope can be specific to an individual driver or to a type or category of driver. A driving envelope that is individualized to a specific driver is a representation of certain aspects of that person's driving style so as to define the aspects of driving with which that driver is (or is not) comfortable. Such preferences can be different depending on whether it is the person or the assisted-driving system that is currently in charge of the vehicle. Accordingly, the preference(s) of an individual driver with regard to his or her own driving do not necessarily translate into an identical driving envelope for the assisted-driving system. Rather, differences in preference between the two can exist. A driving envelope can be defined based on one or more arguments. For example, the driving envelope can be a function of the context(s) of a detected event, a vehicle yaw rate, and vehicle speed.

Examples herein mention a likelihood of successful takeover. A takeover is a situation where the human driver takes over control from an assisted-driving system. This can happen when the assisted-driving system enters a state where it requests the driver (e.g., upon detecting a fault) to take control, or the person can otherwise voluntarily choose to take charge of the vehicle. A takeover can be deemed successful if the human driver is comfortable with the driving tasks that present themselves at the time of the takeover and for a limited time thereafter. In some implementations, a voluntary takeover can be deemed successful if the driver does not re-engage the assisted-driving system within a predetermined time. In the above examples, the length of the particular time can depend on the circumstances and/or the driver. For example, after a successful takeover the driver can control the vehicle in a normal fashion for at least on the order of a number of seconds (e.g., multiple seconds, or dozens of seconds).

Examples herein refer to a human being as the driver of a vehicle. As used herein, the term driver includes a human being that is being transported by a vehicle, regardless of the state of automation (if any) with which the vehicle is equipped, and regardless of whether an assisted-driving system of the vehicle is currently active. As such, for simplicity a person can here be referred to as a driver of the vehicle both when the person is driving the vehicle and when an assisted-driving system is operating.

Examples herein refer to an event. An event is a concrete or abstract occurrence that can be detected by one or more systems. An event can include one or more maneuvers identified as members of a discrete set. An event can include sub-events occurring simultaneously with each other or within a common time span defined by the event. Examples of events include, but are not limited to: a lane change, following a lead vehicle, staying in lane without a lead vehicle, or creating a gap to allow another vehicle to enter a lane. An event can include a dynamic driving task and/or a task that is not a dynamic driving task (including, but not limited to, a task of maintaining current speed and current lateral lane placement for the vehicle).

Examples herein refer to a context relating to a driver and/or a vehicle. A context is one or more quantitative or qualitative exogenous metrics temporally related to an event. An exogenous metric relative to a vehicle or a driver is a metric that is external to the vehicle and its systems, and/or to the driver, respectively. A causal connection between a context and an event can sometimes be evident or inferred, but causality is not a requirement. Examples of contexts include, but are not limited to: weather (e.g., precipitation, temperature, or light conditions); traffic conditions (e.g., average velocity, density, or degree of order); vehicle conditions (e.g., speed, acceleration, trajectory, occupancy, passenger cabin climate, or infotainment system operation status); road condition (e.g., curve radius, bank angle, number of lanes, surface material, surface condition, surface traction).

Examples herein refer to machine-learning algorithms. As used herein, a machine-learning algorithm can include an implementation of artificial intelligence where a machine such as an assisted-driving system has capability of perceiving its environment and taking actions to achieve one or more goals. A machine-learning algorithm can apply one or more principles of data mining to derive a driving envelope from data collected regarding a vehicle and its related circumstances. A machine-learning algorithm can be trained in one or more regards. For example, supervised, semi-supervised, and/or unsupervised training can be performed. In some implementations, a machine-learning algorithm can make use of one or more classifiers. For example, a classifier can assign one or more labels to instances recognized in processed data. In some implementations, a machine-learning algorithm can make use of one or more forms of regression analysis. For example, a machine-learning algorithm can apply regression to determine one or more numerical values. In some implementations, a machine-learning algorithm can be configured to collect and store data, detect events using the data, identify the context(s) using the data, and generate a driving envelope based at least in part on a detected event and the context(s).

FIG. 1 shows an example of a system 100 that defines a driving envelope. The system 100 can be used with one or more other examples described elsewhere herein. The system 100 and/or one or more of its components can operate by way of at least one processor executing instructions stored in a computer-readable medium, for example as described below with reference to FIG. 10. In some implementations, the system 100 can be configured to define the driving envelope in a way to increase a likelihood of successful takeover from an assisted-driving system by a person.

The system 100 can define the driving envelope in part by collecting and processing data about how a human operates a vehicle. The system 100 receives one or more inputs 102, here conceptually illustrated as a box. The inputs 102 can include a sensor reading from any or all sensors of the vehicle. For example, the inputs 102 can reflect or otherwise indicate a circumstance regarding the vehicle and/or an action taken by the driver. The inputs 102 can reflect or otherwise indicate the occurrence of one or more events and/or driver triggers, in the presence of one or more context parameters. For example, the inputs 102 can reflect or otherwise indicate a lane change event. As another example, the inputs 102 can reflect or otherwise indicate that the driver takes (or does not take) one or more actions that would trigger a response from the vehicle. As another example, the inputs 102 can reflect or otherwise indicate the presence or absence of one or more ambient conditions (e.g., the presence or absence of a particular weather phenomenon). In some implementations, the inputs 102 can include sensor data reflecting how a person drives the vehicle. For example, this can allow the person's driving preferences and driving characteristics to be analyzed and taken into account in generating a driving envelope. In some implementations, the inputs 102 can include sensor data reflecting a user's response to how an assisted-driving system controls the vehicle. For example, the user can provide feedback by taking over control of the vehicle from the assisted-driving system. As another example, the user can provide feedback by making an input into a user interface (e.g., a feedback form) regarding the user's opinion(s) on how the assisted-driving system controls the vehicle.

The system 100 includes a system 104 for data acquisition and storage. The system 104 can receive one or more of the inputs 102, process the input(s) 102, and generate at least one output. In some implementations, the system 104 is installed in a vehicle. For example, the system 104 can be characterized as an on-board system.

The system 104 can include an event detection component 106. In some implementations, the event detection component 106 can detect behaviors and/or maneuvers executed by the driver. In some implementations, the event detection component 106 can monitor the driver's behavior to identify the maneuver(s) as being member of one or more discrete sets. Examples include, but are not limited to, a lane change, following a lead vehicle in lane, staying in lane without a lead vehicle, a hard braking, or a reduction or increase in time gap. The event detection component 106 can identify the quantitative or qualitative endogenous metric(s) associated with, or characterizing, the event. Examples include, but are not limited to, determining a duration and/or speed of a lane change, determining a time gap to a lead vehicle when following, determining the speed at which the driver stays in lane when no lead vehicle is present, and/or determining the negative acceleration when creating a gap in front of the ego vehicle to allow another vehicle to enter the lane. The event detection component 106 can include one or more aspects of a machine-learning algorithm. In some implementations, the event detection component 106 can depend on, or be provided by, an assisted-driving system for a vehicle. For example, the assisted-driving system can be installed in the same vehicle, and the detection of the event(s) can be performed by the assisted-driving system. In some implementations, the event detection component 106 can identify at least one event in data from the inputs 102, and apply a tag to the identified event.

The event detection component 106 can be installed in a vehicle that has no assisted-driving system, or that does have an assisted-driving system. In the latter scenario, the assisted-driving system can be active or inactive while data is being collected by the system 104. For example, if the assisted-driving system is in operation an event detected by the system 104 can be attributable in part to the driver and in part to the assisted-driving system. Accordingly, the event detection component 106 can depend on the operational status of an assisted-driving system in detecting the event(s). For example, identifying an event can include taking into account an autonomous-driving level of operation of an assisted-driving system installed in the vehicle when the sensor data is generated by the sensors of the inputs 102.

Detecting an event can include determination that a driver takes over control of the vehicle. For example, the event detection component 106 can determine that while the assisted-driving system had not entered a fault state or otherwise requested driver takeover, the driver nevertheless took control of the vehicle at a particular time. Such a determination can be relevant to event detection.

The system 100 can be installed in a vehicle for purposes of collecting data regarding a person's operation of that vehicle. Such data can be processed for defining one or more driving envelopes to be applied when the person is driving a vehicle having an assisted-driving system. The vehicle where the driving envelope is applied can be the same vehicle as, or the same model and/or make of vehicle, as the vehicle where the data was collected. As another example, the vehicle where the driving envelope is applied can be a different vehicle than the vehicle where the data was collected.

The system 104 here includes a context identification component 108. The context identification component 108 can detect external operating conditions under which the driver does (or does not) execute operations detected as events. In some implementations, the context identification component 108 can collect quantitative or qualitative exogenous metrics related to the event(s). In some implementations, the context identification component 108 can tag the weather, traffic conditions, road curvature, and/or road state. The context identification component 108 can include one or more aspects of a machine-learning algorithm.

The system 104 here includes an on-board data recorder 110. The on-board data recorder 110 can record information output by the event detection component 106 and by the context identification component 108. In some implementations, the on-board data recorder 110 can facilitate that data is persisted in one or more locations by way of a storage 112. For example, the storage 112 can include an on-site/cloud data store 114. As another example, the storage 112 can include an on-board data store 116. The data placed in the storage 112 can have one or more formats suitable for processing to be performed later. For example, the output from the event detection component 106 and/or the context identification component 108 can be formatted before storage.

The system 100 here includes a component 118 that is tasked with composing a driving envelope and generating a configuration for an assisted-driving system 120. In some implementations, the component 118 will identify at least one configuration parameter for the assisted-driving system 120, determine a value for the configuration parameter, and provide the value to the assisted-driving system 120. Such a configuration parameter can control at least one aspect of the assisted-driving system 120. For example, a driving envelope can regulate the relationship between a yaw rate r currently being applied to the vehicle's front wheels, and a sideslip that the vehicle currently has. In some implementations, the component 118 can implement a learning-based software algorithm to infer the driving envelope from information about the driving performed by the person. For example, it can be inferred from the data that the person usually slows down to about 55 miles per hour (mph) on a 65-mph highway for a curve with radius of about 200 meters in no traffic when it is raining more than 0.5 inches per hour.

Other types of inferences can be made, including the same or different criteria. In some implementations, the component 118 can distinguish between the driver feeling comfortable with a certain maneuver when the driver is in control, versus the driver perhaps feeling more or less comfortable with the same maneuver, under the same road and weather conditions, when the vehicle is controlled by the assisted-driving system 120.

The driving envelope can be stored in a format that permits convenient access (e.g., by a query operation) to information that is relevant to one or more decisions by the assisted-driving system 120. In some implementations, one or more configuration values can be stored in a table 122. For example, the table 122 can be tailored for context- and event-driven configuration of the assisted-driving system 120.

The assisted-driving system 120 can obtain information from the table 122 for deciding whether or not to perform one or more actions. For example, the assisted-driving system 120 can query the component 118 for such information. As another example, the assisted-driving system 120 can directly access the table 122. The obtained information can allow assisted-driving system 120 to select the limit(s) of operation to be applied to one or more decisions. In some implementations, a cost function can be designed for a region defined by one or more operational limits. For example, such operational limit(s) can describe the region over which the cost function is valid. In some implementations, a cost defined by the function can increase as the vehicle's trajectory on the road deviates from a normal driving envelope given the applicable context.

The above examples illustrate that a method can include receiving sensor data (e.g., by the inputs 102) from sensors of a first vehicle. Such sensor data can be generated by the sensors while a first person drives the first vehicle. The method can include applying a machine-learning algorithm (e.g., from the system 100) to the sensor data to define a driving envelope (e.g., by the component 118) for an assisted-driving system (e.g., for the assisted-driving system 120). The assisted-driving system can be installed in a second vehicle. The method can include providing the driving envelope (e.g., as the table 122) to the assisted-driving system installed in the second vehicle.

Figure 2:
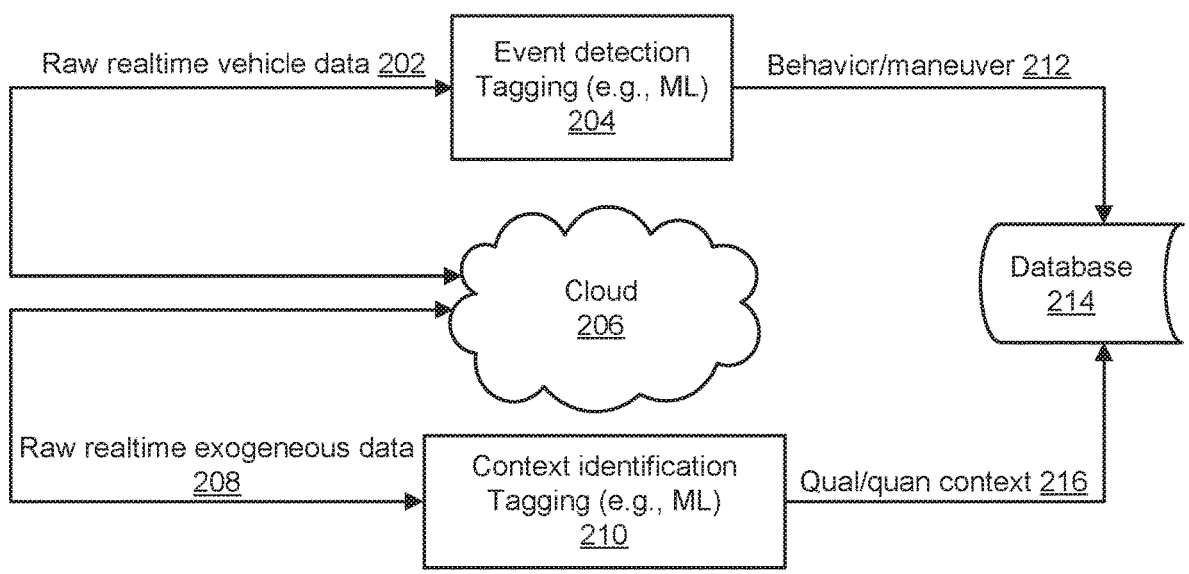
FIG. 2 shows a flow chart of an example of collecting data for defining a driving envelope.

FIG. 2 shows a flow chart of an example 200 of collecting data for defining a driving envelope. The example 200 can be used with one or more other examples described elsewhere herein. The example 200 and/or one or more of its components can operate by way of at least one processor executing instructions stored in a computer-readable medium, for example as described below with reference to FIG. 10. In some implementations, the example 200 can be used in defining a driving envelope in a way to increase a likelihood of successful takeover from an assisted-driving system by a person.

Data 202 enters the example 200. In some implementations, the data 202 can be characterized as raw realtime vehicle data. The data can come from one or more sensors of the vehicle (e.g., from a sensor suite dedicated to an assisted-driving system).

The data 202 can be provided to one or more aspects of the example 200. The data 202 can be provided to a component 204. In some implementations, the component 204 can be responsible for detecting events in the data 202, and for tagging the data according to the detection. For example, the component 204 can apply one or more aspects of a machine-learning algorithm in its operation. The data 202 can be provided to a cloud 206.

Data 208 enters the example 200. In some implementations, the data 208 can be characterized as raw realtime exogeneous data and can be context data pertaining to a vehicle being monitored. The data can come from one or more sensors of the vehicle (e.g., from a sensor suite dedicated to an assisted-driving system) and/or from an external source (e.g., a weather report service, a mapping service, or a road condition reporter).

The data 208 can be provided to one or more aspects of the example 200. The data 208 can be provided to a component 210. In some implementations, the component 210 can be responsible for detecting contexts in the data 208, and for tagging the data according to the detection. For example, the component 210 can apply one or more aspects of a machine-learning algorithm in its operation. The data 208 can be provided to the cloud 206.

The component 204 can generate output 212. In some implementations, the output 212 reflects a behavior or maneuver by the driver of the vehicle. The output 212 can be provided with a suitable format and can be stored in a database 214.

The component 210 can generate output 216. In some implementations, the output 216 reflects a qualitative or quantitative context of the output 212 (e.g., as relevant to the behavior or maneuver by the driver of the vehicle). The output 216 can be provided with a suitable format and can be stored in the database 214.

The database 214 can be updated with new information at regular intervals or at random times. In some implementations, the database 214 is updated when the component 204 and/or 210 generates new output. For example, this can result in updates of the database 214 taking place one or more minutes apart from each other. As data accumulates in the database 214, a software algorithm can update one or more driving envelopes and increase the accuracy or precision of its boundaries.

Figure 3:
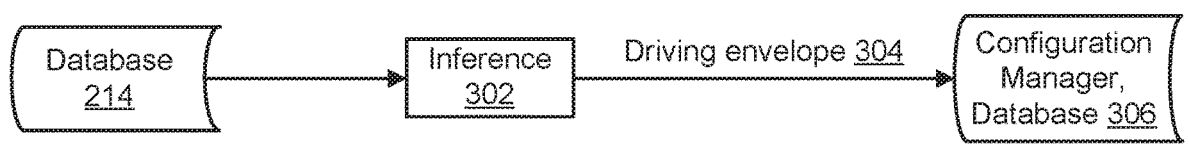
FIG. 3 shows a flow chart of an example of defining a driving envelope.

FIG. 3 shows a flow chart of an example 300 of defining a driving envelope. The example 300 can be used with one or more other examples described elsewhere herein. The example 300 and/or one or more of its components can operate by way of at least one processor executing instructions stored in a computer-readable medium, for example as described below with reference to FIG. 10. In some implementations, the example 300 can be configured to define a driving envelope in a way to increase a likelihood of successful takeover from an assisted-driving system by a person.

In the example 300, the database 214 provides information to a component 302 configured to perform one or more inferences based on that information. In some implementations, the component 302 can infer driver skills, driver preferences, and/or driver practices regarding the driver whose data was collected and processed (e.g., tagged). The component 302 can output one or more driving envelopes 304. In some implementations, the driving envelope 304 can define one or more controllable aspects of an assisted-driving system. For example, the driving envelope 304 can also or instead be characterized as a controllability envelope. The example 300 can provide the driving envelope 304 to a configuration manager 306. In some implementations, the configuration manager 306 controls the configuration(s) to be applied to an assisted-driving system so as to favor safe takeover by, and enjoyable rider comfort for, the driver. For example, the configuration manager 306 can include one or more databases.

The database of the configuration manager 306 can be updated with new information at regular intervals or at random times. In some implementations, the database is updated when the component 302 generates new output. For example, this can result in updates of the database taking place one or more days apart from each other. In some implementations, batch-wise updating of the driving envelope 304 is performed based on additional sensor data generated by the sensors over a period of time.

FIG. 4 shows a flow chart of an example 400 of a driving envelope being used by an assisted-driving system of a vehicle. The example 400 can be used with one or more other examples described elsewhere herein. The example 400 and/or one or more of its components can operate by way of at least one processor executing instructions stored in a computer-readable medium, for example as described below with reference to FIG. 10. In some implementations, the example 400 can be configured to provide a driving envelope that increases a likelihood of successful takeover from an assisted-driving system by a person.

Here, an assisted-driving system 402 is determining whether to take action in a context currently represented by circumstances 404. Solely as an example, the assisted-driving system 402 could be about to decide whether to institute a lane-change maneuver. The assisted-driving system 402 can formulate a query 406 to the configuration manager 306. In some implementations, the query 406 indicates the contemplated maneuver. The assisted-driving system 402 can query the configuration manager 306 in an effort to ensure that the intended behavior and maneuvers are within the envelope with which the driver is comfortable or competent. This can seek to ensure that the driver is capable of taking control of the vehicle if necessary. For example, this can involve ascertaining that the vehicle is not going faster, is not positioned closer to other vehicles, and/or is not turning more sharply than how the driver would operate the vehicle himself or herself. The query can seek to ensure that the driver feels safe and comfortable during the maneuver. For example, this can increase trust in the assisted-driving system 402 and the driver's overall satisfaction with the vehicle and the experience.

Responding to the query 406 can involve the configuration manager 306 accessing one or more databases. The configuration manager 306 can generate a driving envelope 408 in response to the query 406, or the driving envelope 408 can be a pre-determined driving envelope (e.g., a large data set) that is provided in response to the query 406. In some implementations, the driving envelope 408 includes one or more limits on the application or implementation of the action being contemplated by the assisted-driving system 402. For example, the driving envelope 408 can include a speed limit. As another example, the driving envelope 408 can include a limit on longitudinal and/or lateral acceleration. In some implementations, combinations of limits can be used. The result of applying the driving envelope 408 can be that the assisted-driving system 402 initiates a lane change only if the gap (i.e., separation between vehicles) in the adjacent lane is at least x feet and the assisted-driving system 402 has y seconds or more at its disposal to complete the action.

Assuming that the assisted-driving system 402 decides to initiate the action, the assisted-driving system 402 can make one or more outputs. In some implementations, the assisted-driving system 402 outputs information corresponding to a trajectory 410. The driving envelope 408 may have specified or regulated one or more aspects of the trajectory 410. The trajectory 410 can correspond to causing the vehicle to assume particular location, speed, acceleration, and rate of change in acceleration (sometimes called "jerk"). For example, the trajectory 410 can be effectuated by setting the steering angle of the wheel(s) and the torque output of the propulsion motor(s). An execution 412 here conceptually represents that the driving envelope 408 is being used in performing the action based on the trajectory 410. A driver 414 is a human being, and is here schematically illustrated using a circle. The driver 414 is subjected to the execution 412 of the action planned and performed by the assisted-driving system 402.

In some implementations, the assisted-driving system 402 may not need to query the configuration manager 306 for every action to be undertaken. Regarding one or more particular action(s), the driving envelope 408 can essentially consist of at least one number, which the assisted-driving system 402 can maintain in local storage accessible without query. For example, when it is known that the driver 414 is sensitive to lateral acceleration, the assisted-driving system 402 can ensure, without needing to query the configuration manager 306 each time, that no maneuver should be planned that increases lateral acceleration above a certain value. That is, such tuning parameters may always be valid for the driver 414.

The configuration manager 306 and/or the assisted-driving system 402 can benefit from input of a realtime data provider 416. The realtime data provider 416 can provide one or more pieces of information to be taken into account in generating the driving envelope 408. In some implementations, comfort preferences for an event (e.g., a lane change) can depend on the situation at hand, which can be reflected by the input from the realtime data provider 416. For example, traffic density or the speed of the ego vehicle. At lower speeds, the comfort level of the driver 414 may not be a significant factor, but at greater speeds the comfort may become a significant factor. Continuing the above example about query-less action execution, the assisted-driving system 402 can be provided with information essentially stating the parameter values that apply under visible conditions. If the weather changes, this can trigger the assisted-driving system 402 to submit the query 406. That is, the assisted-driving system 402 installed in the vehicle can take into account realtime data about the vehicle in determining whether to provide the query to the configuration manager before taking the action.

The driver 414 can provide feedback 418 for the benefit of at least the configuration manager 306. The feedback 418 can be provided by way of a human-machine interface (HMI) 420. The driver 414 can manifest the feedback 418 by taking action with regard to the vehicle (e.g., by at least partially taking over control from the AD system 402), or enter the feedback 418 into a graphical user interface, or speak the feedback 418 into an audio interface, to name just some examples. In some implementations, the fact that the driver 414 takes over control of the vehicle at the time when the AD system 402 is performing a driving task according to the driving envelope 408 can be detected as the user feedback 418. For example, the user feedback 418 can trigger the configuration manager 306 to adjust, eliminate, and/or add at least one aspect of the driving envelope 408. In some implementations, the example 400 can prompt the driver 414 for the feedback 418, and the feedback 418 can be received by the HMI 420 in response to the prompting. In some implementations, the driver 414 can provide the feedback 418 whether or not the example 400 is configured to prompt for feedback, and whether or not any prompting had occurred.

To prompt for feedback, the HMI 420 can identify the action at issue (e.g., "the lane change just performed") to the driver 414, or the prompt can otherwise be presented in close temporal proximity to the action to avoid ambiguity. For example, a "like" button and/or a "dislike" button can be made available for selection by the driver 414. The HMI 420 can provide the feedback 418 to the configuration manager 306. In some implementations, the feedback 418 can be used for further tailoring (or elimination) of the driving envelope 408. For example, the action that was performed is tagged substantially in realtime as being favored or disfavored by the driver 414, and/or a value of a configuration parameter is updated based on the feedback 418.

In some implementations, the driver 414 who is here the subject of the action performed by the assisted-driving system 402 may be the same person as the one from whose driving the data was obtained that the configuration manager 306 used in defining the driving envelope 408. For example, this can provide the advantage that the driving experience is closely tailored to the particular individual who is the driver 414.

In some implementations, the driving envelope 408 can be generated based on driving data from two or more of the driver 414. As another example, the driving envelope 408 can be applied to multiple respective driving situations involving different persons as the driver 414. In a scenario that involves so-called rideshare activities, two or more different individuals serve as the driver 414 of the same vehicle at different times. In such enterprises, the feedback 418 can be collected from two or more rideshare drivers and be used in tailoring the driving envelope 408 to reasonably fit a collective of individuals who are expected to be the driver 414.

Figure 5A:
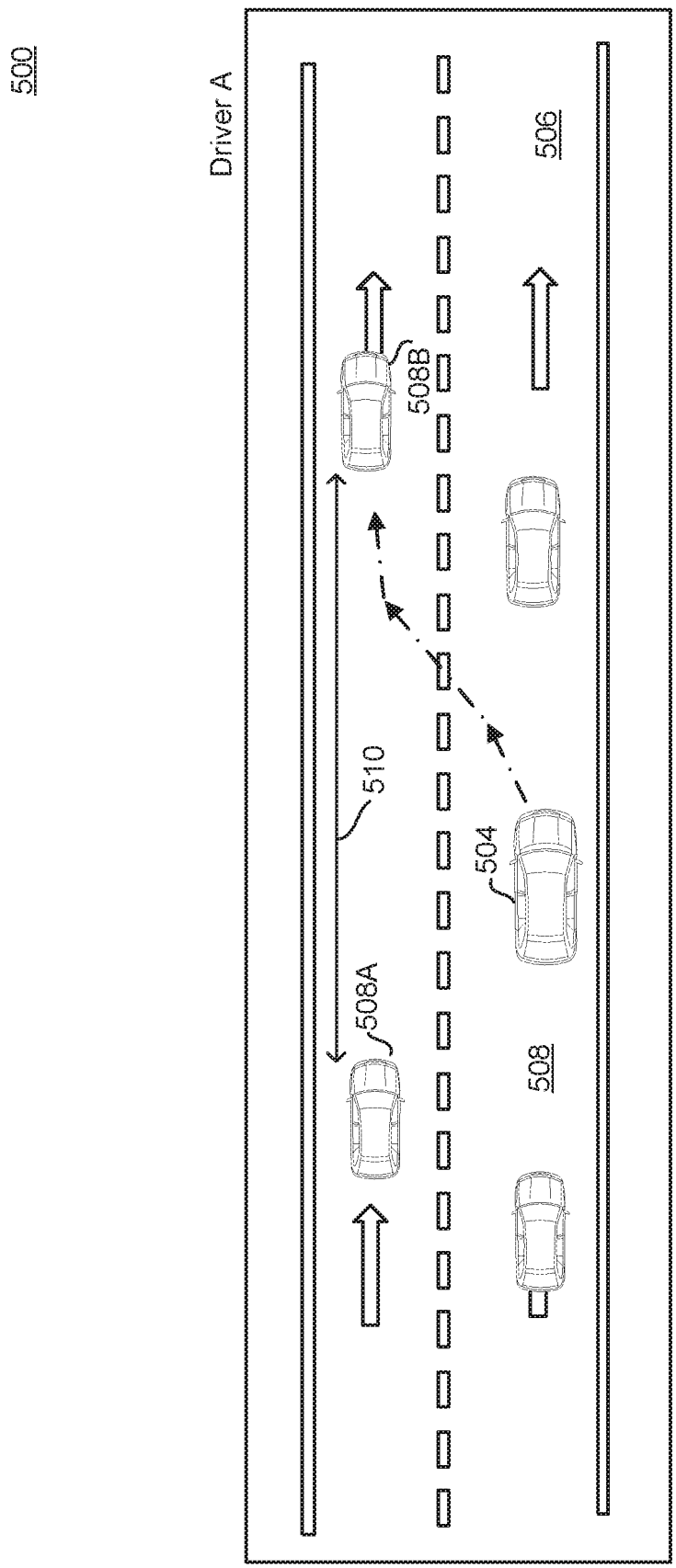
FIGS. 5A-5B show examples of developing a driving envelope for, and using it in performing an action with regard to, a vehicle.
Figure 5B:
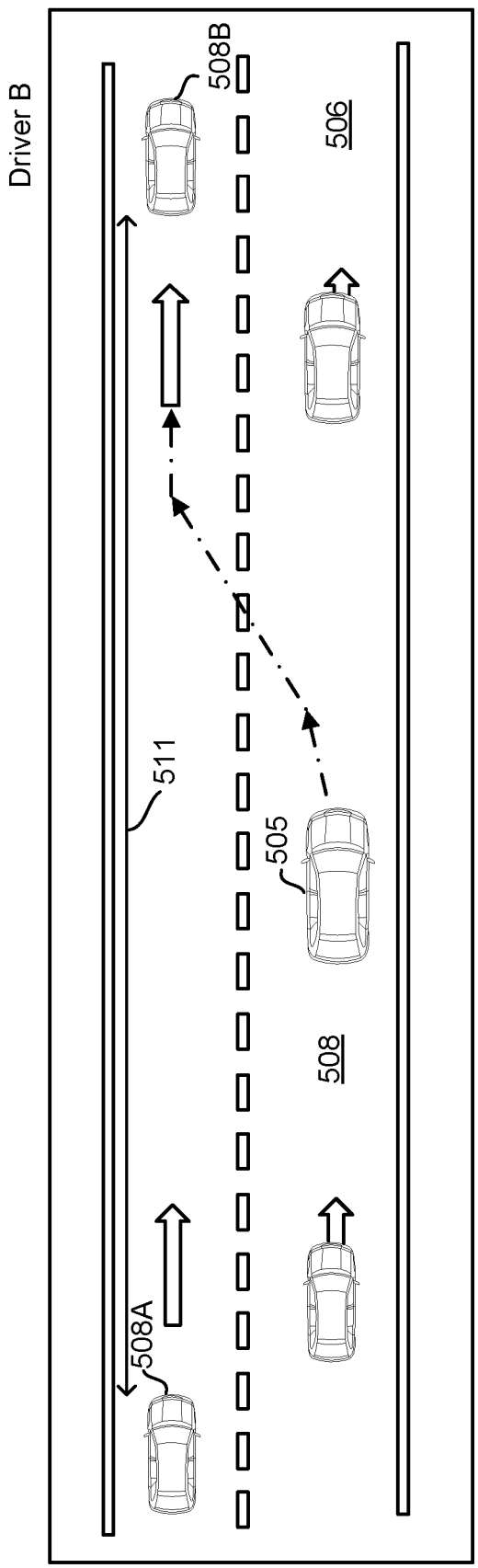

FIGS. 5A-5B show examples 500 and 502 of developing a driving envelope for, and using it in performing an action with regard to, a vehicle 504. The examples 500 or 502 can be used with one or more other examples described elsewhere herein. The vehicle 504 is currently being driven on a roadway 506 that has one-way traffic proceeding in either of two adjacent lanes. Here vehicles 508 are also present on the roadway 506. Particularly, the vehicle 504 is currently positioned in the right lane and vehicles 508A-508B are currently positioned in the left lane. The terms right and left are here used from the perspective of the driver of the vehicle 504.

The driver of the vehicle 504 will be referred to as Driver A. Assume that Driver A wishes to make a lane change and move from the right lane into the left lane. In this example, there is currently a distance 510 between the vehicles 508A-508B along the roadway 506. Driver A considers the distance 510 sufficient for making a lane change and therefore completes this maneuver. The data collection system monitoring the vehicle 504 tracks the relevant data and tags it. For example, the processed data can indicate that under the current conditions of the roadway 506 (e.g., traffic density, road quality, weather) and of the vehicle 504 (e.g., speed, occupancy), the Driver A is comfortable completing the lane change at the current length of the distance 510 (which action may subject the vehicle 504 to certain longitudinal and lateral acceleration). The above can be taken into account (e.g., together with other observed maneuvers) in generating a driving envelope for the Driver A.

When the driving envelope for the Driver A has been generated, it can be applied to an assisted-driving system installed in the vehicle 504. Assume, now, that a similar situation to that shown in FIG. 5A occurs while the assisted-driving system is active. That is, the assisted-driving system contemplates making a lane change and moving from the right lane into the left lane. The assisted-driving system can query a configuration manager and find out relevant parameters. For example, the configuration manager may inform the assisted-driving system that it can execute the lane change as long as the distance between the vehicles 508A-508B is at least equal to the distance 510, and the other conditions are comparable to those when the driver data was tagged. In this example, the assisted-driving system would then execute the action. This would be a comfortable experience for the Driver A. Moreover, if a situation should occur such that the Driver A needed to take over control of the vehicle 504 during the action, it could be expected that the takeover would have a high likelihood of being successful.

Turning now to FIG. 5B, a driver of a vehicle 505 will be referred to as Driver B. In this example, there is currently a distance 511 between the vehicles 508A-508B along the roadway 506, the distance 511 being greater than the distance 510 in FIG. 5A. Assume that Driver B wishes to make a lane change and move from the right lane into the left lane. Driver B considers the distance 511 sufficient for making a lane change and therefore completes this maneuver. The data collection system monitoring the vehicle 505 tracks the relevant data and tags it. For example, the processed data can indicate that under the current conditions of the roadway 506 (e.g., traffic density, road quality, weather) and of the vehicle 505 (e.g., speed, occupancy), the Driver B is comfortable completing the lane change at the current value of the distance 511 (which action may subject the vehicle 505 to certain longitudinal and lateral acceleration). The above can be taken into account (e.g., together with other observed maneuvers) in generating a driving envelope for the Driver B.

When the driving envelope for the Driver B has been generated, it can be applied to an assisted-driving system installed in the vehicle 505. Assume, now, that a similar situation to that shown in FIG. 5B occurs while the assisted-driving system is active. That is, the assisted-driving system contemplates making a lane change and moving from the right lane into the left lane. The assisted-driving system can query a configuration manager and find out relevant parameters. For example, the configuration manager may inform the assisted-driving system that it can execute the lane change as long as the distance between the vehicles 508A-508B is at least equal to the distance 511, and the other conditions are comparable to those when the driver data was tagged. In this example, the assisted-driving system would then execute the action. This would be a comfortable experience for the Driver B. Moreover, if a situation should occur such that the Driver B needed to take over control of the vehicle 505 during the action, it could be expected that the takeover would have a high likelihood of being successful.

By contrast, applying the driving envelope for Driver A to the vehicle 505 carrying Driver B may not have an equally successful result as in the above two examples. If the vehicle 505 is subjected to a lane-change maneuver when the distance between the vehicles 508A-508B is only about equal to the distance 510, this may cause Driver B to lose trust in the assisted-driving system. For example, Driver B may consider the action to be subjectively risky or uncomfortable. Moreover, if a situation should occur such that the Driver B needed to take over control of the vehicle 505 in that scenario, the takeover may have a relatively lower likelihood of being successful.

Similarly, applying the driving envelope for Driver B to the vehicle 504 carrying Driver A may not have an equally successful result as when Driver A's driving envelope was applied to Driver A. If the vehicle 504 contemplates a lane-change maneuver when the distance between the vehicles 508A-508B is only about equal to the distance 510, the assisted-driving system may abandon this action because the distance 510 is shorter than the distance 511. Driver A may become annoyed and have a negative experience with the assisted-driving system.

Figure 6:
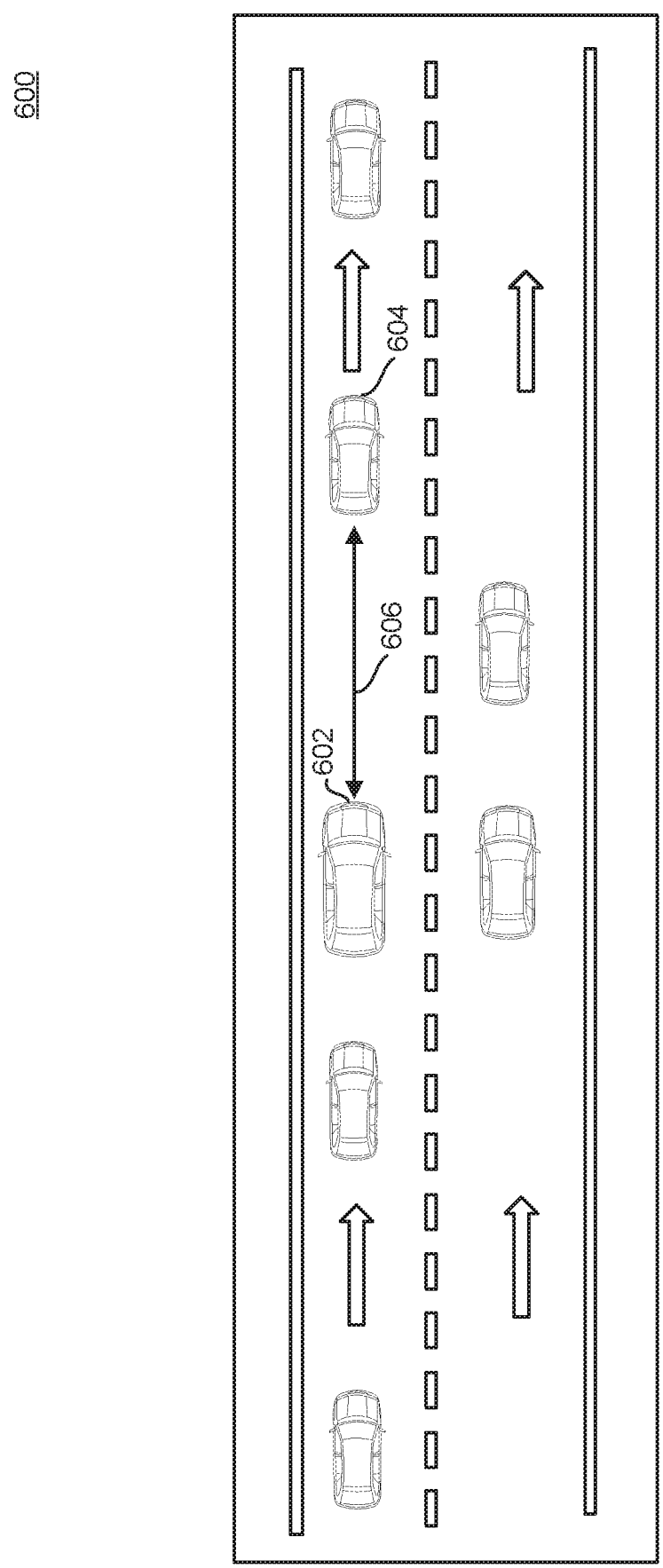
FIG. 6 shows another example of using a driving envelope in performing an action with regard to a vehicle.

FIG. 6 shows another example 600 of using a driving envelope in performing an action with regard to a vehicle 602. The example 600 can be used with one or more other examples described elsewhere herein. This example relates to adaptive cruise control. When the vehicle 602 is driving behind a vehicle 604 in the same lane, the assisted-driving system maintains approximately at least a distance 606 between the vehicles 602 and 604. If the vehicle 604 accelerates, the assisted-driving system may in response accelerate the vehicle 602 (optionally up to a predefined maximum speed). If the vehicle 604 decelerates, the assisted-driving system may in response brake the vehicle 602 to maintain at least the distance 606 between them. The distance 606 can be the subject of a driving envelope.

In some implementations, a Driver C may prefer the distance 606 to be relatively shorter that what a Driver D prefers. For example, when Driver C is riding in the vehicle 602, that relatively shorter extent of the distance 606 may lead the assisted-driving system to brake the vehicle 602 more often. However, Driver C may prefer that relatively fewer vehicles cut into the lane between the vehicles 602 and 604 due to the distance 606 being relatively short.

By contrast, when Driver D is riding in the vehicle 602, that relatively longer extent of the distance 606 associated with the driving envelope of Driver D may result in more vehicles cutting into the lane between the vehicles 602 and 604. However, Driver D may appreciate that the assisted-driving system brakes the vehicle 602 less often due to the distance 606 being relatively long.

Figure 7:
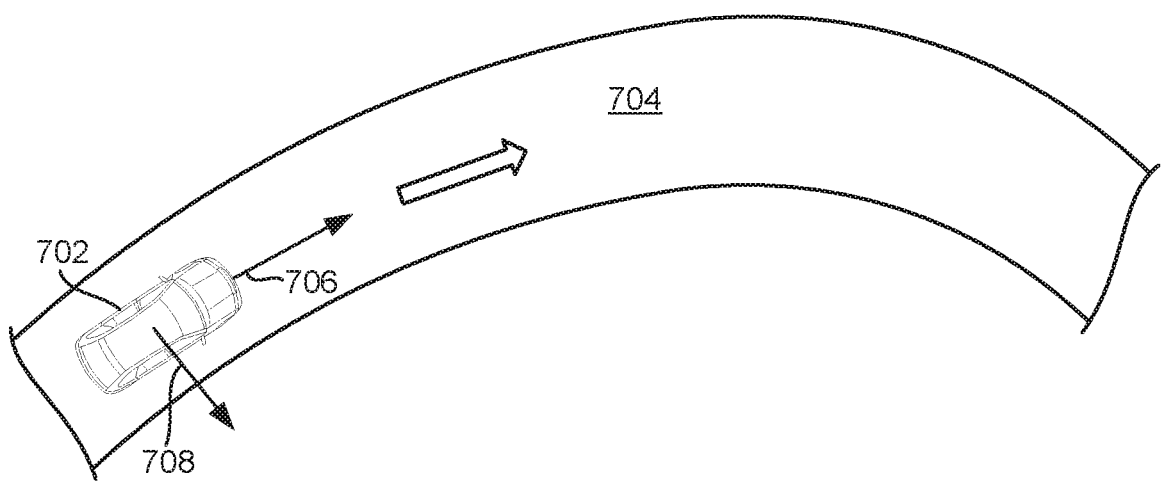
FIG. 7 shows another example of using a driving envelope in performing an action with regard to a vehicle.

FIG. 7 shows another example 700 of using a driving envelope in performing an action with regard to a vehicle 702. The example 700 can be used with one or more other examples described elsewhere herein. The vehicle 702 is currently traveling through a curve 704 at a velocity 706, which is schematically illustrated as a velocity vector. The turning of the vehicle 702 due to the curve 704 corresponds to the vehicle 702 (and the driver) being subjected to a lateral acceleration 708, which is schematically illustrated as a force vector. The lateral acceleration 708 depends on how sharp the curve 704 is (e.g., its radius of curvature at every point), and on the velocity 706. A Driver E may prefer only a minimal slowdown (or no slowdown) of the velocity 706 for curves, and may not mind a relatively high instance of the lateral acceleration 708 when traveling through the curve 704. The above can be taken into account (e.g., together with other observed maneuvers) in generating a driving envelope for the Driver E.

A Driver F, on the other hand, may prefer a noticeable slowdown of the velocity 706 for curves, and may not be comfortable with a relatively high instance of the lateral acceleration 708 when traveling through the curve 704. The above can be taken into account (e.g., together with other observed maneuvers) in generating a driving envelope for the Driver F.

Figure 8A:
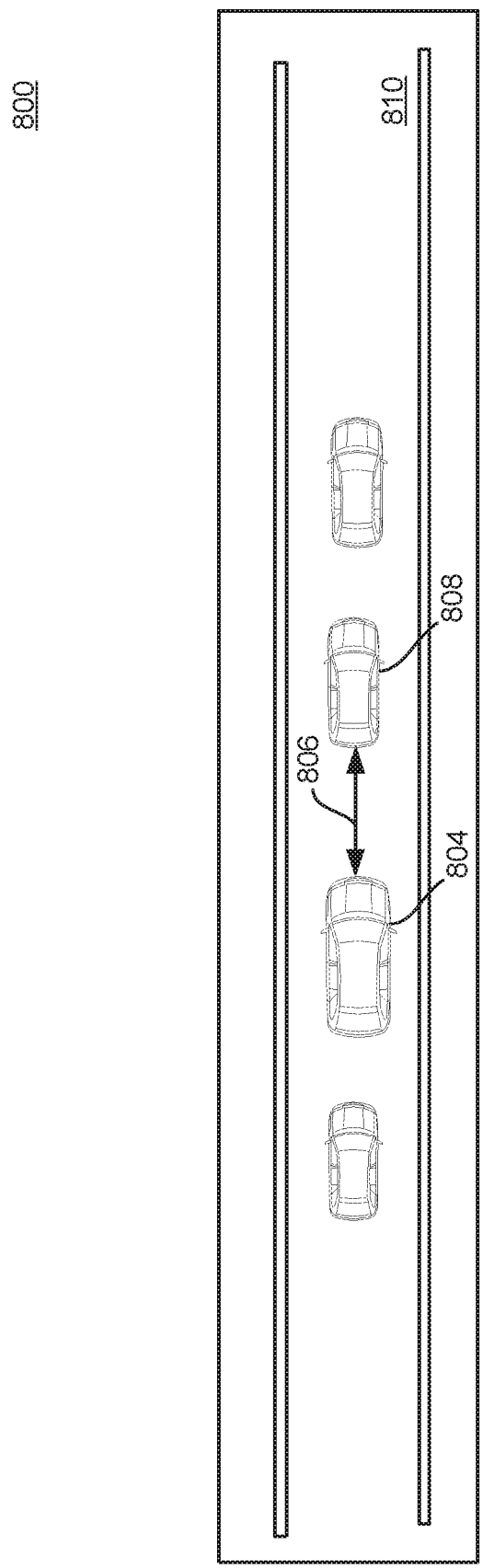
FIGS. 8A-8B show other examples of using a driving envelope in performing an action with regard to a vehicle.
Figure 8B:
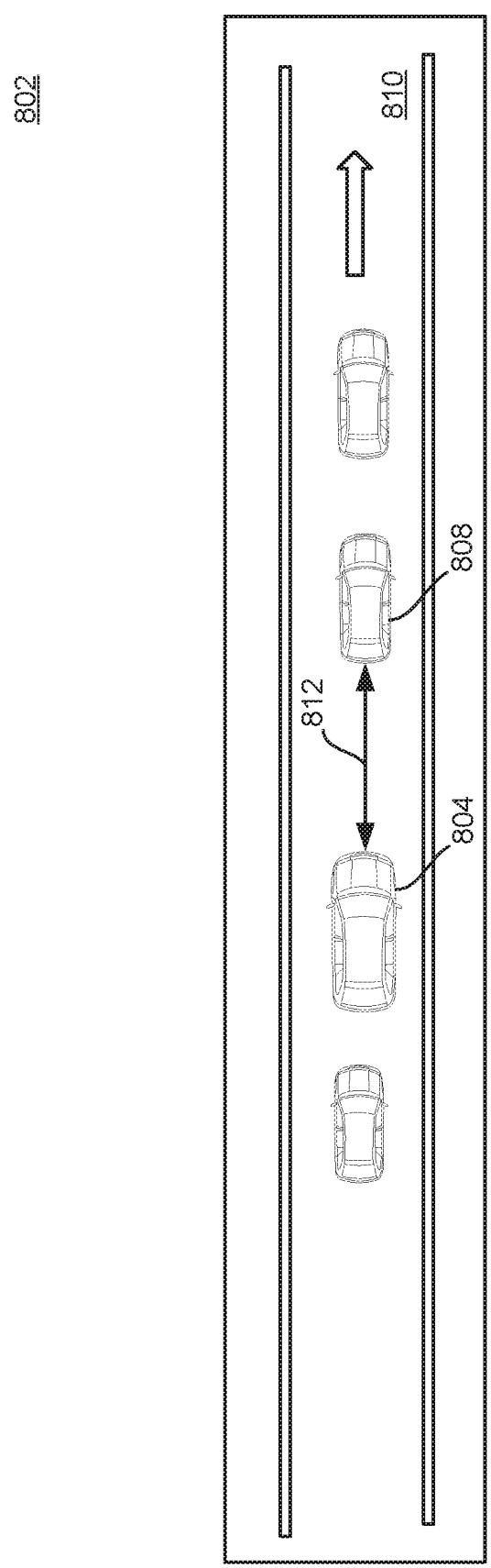

FIGS. 8A-8B show other examples 800 and 802 of using a driving envelope in performing an action with regard to a vehicle 804. The examples 800 and 802 can be used with one or more other examples described elsewhere herein. In the example 800, the vehicle 804 is currently stopped a distance 806 behind a vehicle 808, which is also stationary, on a roadway 810. That is, no vehicles visible on the roadway 810 are currently moving, such as due to congestion or a traffic light. Driver G controls the vehicle 804 and stopped at the distance 806 from the vehicle 808 as a matter of the preference or usual practice of Driver G. The above can be taken into account (e.g., together with other observed maneuvers) in generating a driving envelope for the Driver G.

In the example 802, the vehicle 804 is controlled by Driver H and is currently stopped a distance 812 behind a vehicle 808, which has begun to move forward, on the roadway 810. That is, the vehicles visible on the roadway 810 may recently have come to a standstill, such as due to congestion or a traffic light, and the distance 812 is currently increasing due to the movement of the vehicle 808 while the vehicle 804 remains stationary. Driver H begins moving the vehicle 804 forward when the distance 812 from the vehicle 808 has increased to a certain length compared to the distance when the vehicles 804 and 808 were stationary. Driver H does this as a matter of preference or usual practice. The above can be taken into account (e.g., together with other observed maneuvers) in generating a driving envelope for the Driver H.

Figure 9:
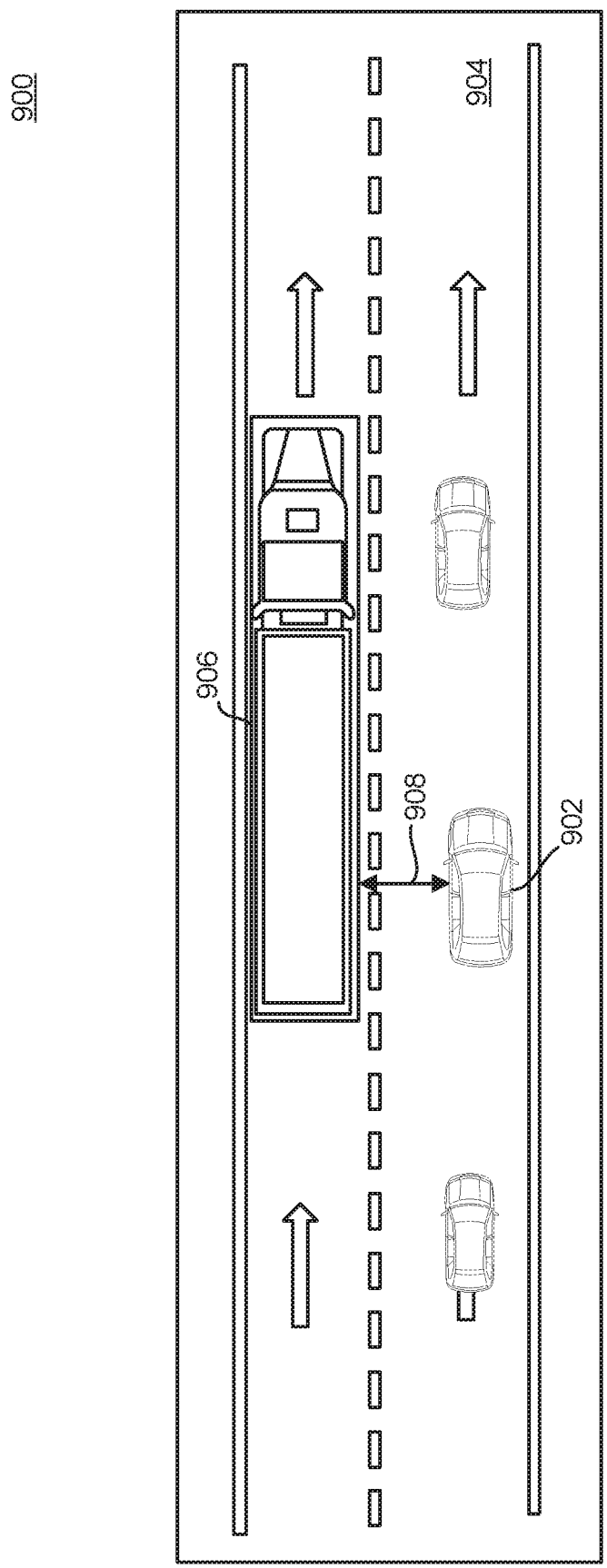
FIG. 9 shows another example of using a driving envelope in performing an action with regard to a vehicle.

FIG. 9 shows another example 900 of using a driving envelope in performing an action with regard to a vehicle. The example 900 can be used with one or more other examples described elsewhere herein. A vehicle 902 is currently being driven on a roadway 904 that has one-way traffic proceeding in either of two adjacent lanes. Here, a large vehicle 906 (e.g., a tractor with one or more semi-trailers, or a bus) is also present on the roadway 904. The large vehicle 906 and the vehicle 902 are currently side by side with each other on the roadway 904. For example, the large vehicle 906 and the vehicle 902 may be traveling at the same speed, or either of the large vehicle 906 or the vehicle 902 may currently be passing the other. The vehicle 902 is currently positioned in the right lane and the large vehicle 906 is currently positioned in the left lane. The terms right and left are here used from the perspective of the driver of the vehicle 902. Driver I controls the vehicle 902 and has created a distance 908 from the large vehicle 906 as a matter of the preference or usual practice of Driver I. For example, the distance 908 can be referred to as a lane bias.

In some implementations, the Driver I can create the distance 908 as part of at least partially taking over control from an assisted-driving system of the vehicle 902. For example, the Driver I may feel that the assisted-driving system uses too little (or too much) lane bias with regard to the large vehicle 906 and may therefore prefer to take over control to increase (or decrease) the lane bias. Accordingly, the assisted-driving system can interpret the takeover by Driver I as a user feedback on the lane bias so as to apply a different lane bias (e.g., corresponding to the distance 908) from then on.

The above can be taken into account (e.g., together with other observed maneuvers) in generating a driving envelope for the Driver I.

Figure 10:
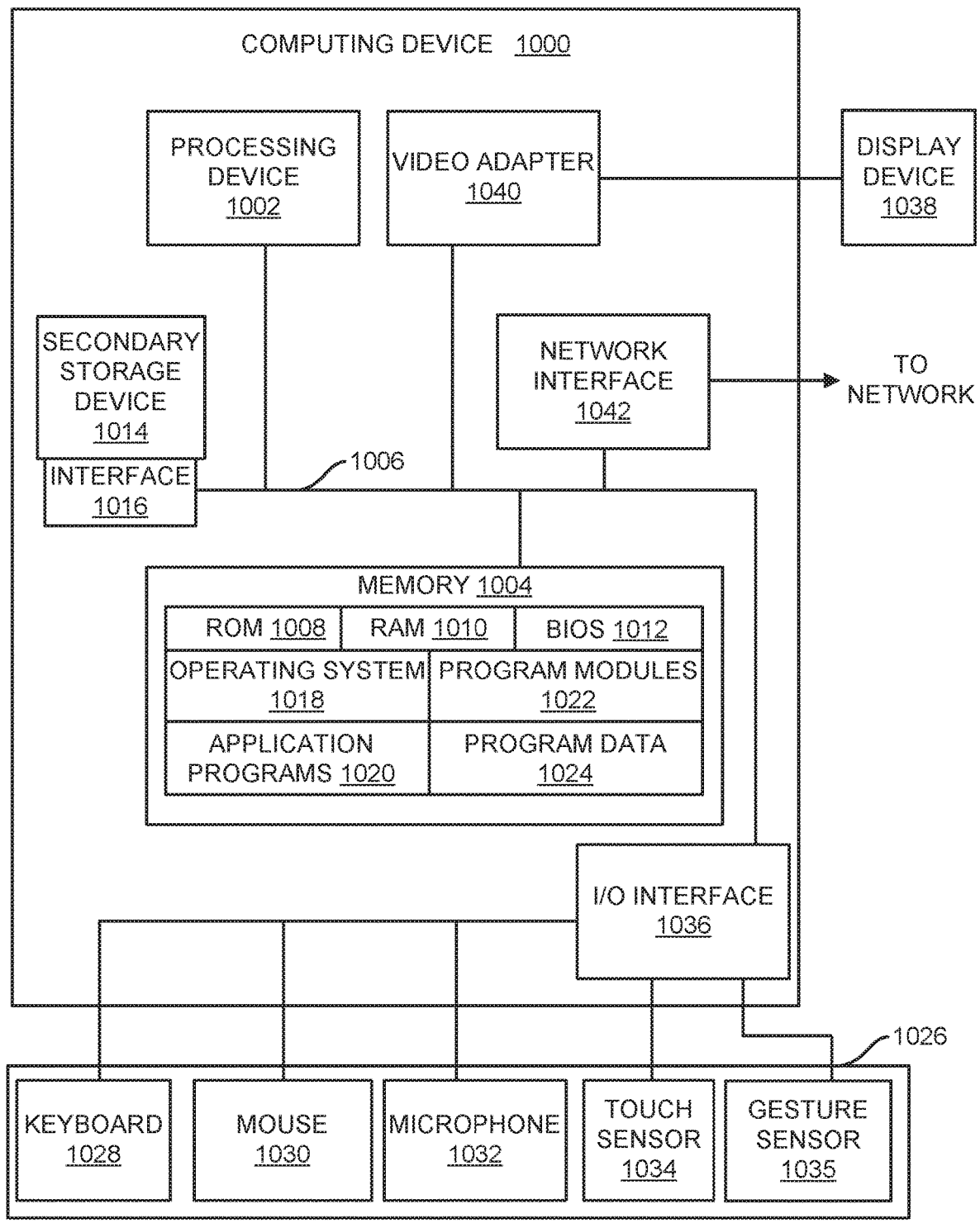
FIG. 10 illustrates an example architecture of a computing device that can be used to implement aspects of the present disclosure.

FIG. 10 illustrates an example architecture of a computing device 1000 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 10 can be used to execute the operating system, application programs, and/or software modules (including the software engines) described herein.

The computing device 1000 includes, in some embodiments, at least one processing device 1002 (e.g., a processor), such as a central processing unit (CPU). A variety of processing devices are available from a variety of manufacturers, for example, Intel or Advanced Micro Devices. In this example, the computing device 1000 also includes a system memory 1004, and a system bus 1006 that couples various system components including the system memory 1004 to the processing device 1002. The system bus 1006 is one of any number of types of bus structures that can be used, including, but not limited to, a memory bus, or memory controller; a peripheral bus; and a local bus using any of a variety of bus architectures.

Examples of computing devices that can be implemented using the computing device 1000 include a desktop computer, a laptop computer, a tablet computer, a mobile computing device (such as a smart phone, a touchpad mobile digital device, or other mobile devices), or other devices configured to process digital instructions.

The system memory 1004 includes read only memory 1008 and random access memory 1010. A basic input/output system 1012 containing the basic routines that act to transfer information within computing device 1000, such as during start up, can be stored in the read only memory 1008.

The computing device 1000 also includes a secondary storage device 1014 in some embodiments, such as a hard disk drive, for storing digital data. The secondary storage device 1014 is connected to the system bus 1006 by a secondary storage interface 1016. The secondary storage device 1014 and its associated computer readable media provide nonvolatile and non-transitory storage of computer readable instructions (including application programs and program modules), data structures, and other data for the computing device 1000.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 1014 and/or system memory 1004, including an operating system 1018, one or more application programs 1020, other program modules 1022 (such as the software engines described herein), and program data 1024. The computing device 1000 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1000 through one or more input devices 1026. Examples of input devices 1026 include a keyboard 1028, mouse 1030, microphone 1032 (e.g., for voice and/or other audio input), touch sensor 1034 (such as a touchpad or touch sensitive display), and gesture sensor 1035 (e.g., for gestural input). In some implementations, the input device(s) 1026 provide detection based on presence, proximity, and/or motion. In some implementations, a user may walk into their home, and this may trigger an input into a processing device. For example, the input device(s) 1026 may then facilitate an automated experience for the user. Other embodiments include other input devices 1026. The input devices can be connected to the processing device 1002 through an input/output interface 1036 that is coupled to the system bus 1006. These input devices 1026 can be connected by any number of input/output interfaces, such as a parallel port, serial port, game port, or a universal serial bus. Wireless communication between input devices 1026 and the input/output interface 1036 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 1038, such as a monitor, liquid crystal display device, light-emitting diode display device, projector, or touch sensitive display device, is also connected to the system bus 1006 via an interface, such as a video adapter 1040. In addition to the display device 1038, the computing device 1000 can include various other peripheral devices (not shown), such as speakers or a printer.

The computing device 1000 can be connected to one or more networks through a network interface 1042. The network interface 1042 can provide for wired and/or wireless communication. In some implementations, the network interface 1042 can include one or more antennas for transmitting and/or receiving wireless signals. When used in a local area networking environment or a wide area networking environment (such as the Internet), the network interface 1042 can include an Ethernet interface. Other possible embodiments use other communication devices. For example, some embodiments of the computing device 1000 include a modem for communicating across the network.

The computing device 1000 can include at least some form of computer readable media. Computer readable media includes any available media that can be accessed by the computing device 1000. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1000.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
receiving sensor data from sensors of a first vehicle associated with a first person, the sensor data generated by the sensors, wherein the sensor data is received while the first person drives the first vehicle;
applying a machine-learning algorithm to the sensor data to define a driving envelope for an assisted-driving system, the assisted-driving system installed in a second vehicle, wherein the sensor data to which the machine-learning algorithm is applied to define the driving envelope includes sensor data representing one or more events in which the first person takes over control over the vehicle from the assisted-driving system and wherein the driving envelope is defined so as to increase a likelihood that, upon takeover of control of the vehicle from the assisted-driving system by the first person, the first person does not re-engage the assisted-driving system within a predetermined time; and
providing the driving envelope to the assisted-driving system installed in the second vehicle, wherein the assisted-driving system installed in the second vehicle controls the second vehicle in a continuous manner by repeatedly providing queries to a configuration manager, wherein the driving envelope is continuously provided to the assisted-driving system by the configuration manager in response to the queries, and wherein the assisted-driving system creates a trajectory for the second vehicle using the driving envelope.

2. The computer-implemented method of claim 1, wherein the assisted-driving system operates using at least one configuration parameter, and wherein the assisted-driving system determines a value for the configuration parameter using the driving envelope.

3. The computer-implemented method of claim 2, wherein the configuration parameter controls at least one aspect of the assisted-driving system, the aspect including one or more of a distance between the second vehicle and an object, a speed of the second vehicle, the trajectory of the second vehicle, or an acceleration of the second vehicle.

4. The computer-implemented method of claim 1, wherein applying the machine-learning algorithm comprises:
identifying at least one event in the sensor data; and
applying a tag to the identified event.

5. The computer-implemented method of claim 4, wherein the assisted-driving system is also installed in the first vehicle.

6. The computer-implemented method of claim 4, wherein the assisted-driving system is also installed in the first vehicle, and wherein identifying the at least one event is performed by the assisted-driving system.

7. The computer-implemented method of claim 1, further comprising performing batch-wise updating of the driving envelope based on additional sensor data generated by the sensors over a period of time.

8. The computer-implemented method of claim 1, wherein the first person takes over control of the first vehicle when the assisted-driving system at least in part controls the first vehicle, and wherein the sensor data comprises feedback from the first person on the assisted-driving system.

9. The computer-implemented method of claim 8, wherein the feedback comprises that the first person at least partially takes over control from the assisted-driving system.

10. The computer-implemented method of claim 8, wherein the feedback comprises input by the first person on the assisted-driving system after the first person takes over control of the first vehicle from the assisted-driving system.

11. The computer-implemented method of claim 10, wherein the driving envelope reflects a difference between (i) a first preference by the first person regarding the first person's driving of the second vehicle, and (ii) a second preference by the first person regarding the assisted-driving system's control of the second vehicle.

12. The computer-implemented method of claim 1, wherein the assisted-driving system uses the driving envelope in performing an action with regard to the second vehicle.

13. The computer-implemented method of claim 12, further comprising receiving user feedback from the first person about performance of the action by the assisted-driving system, and updating a value for a configuration parameter of the assisted-driving system based on the user feedback.

14. The computer-implemented method of claim 13, wherein the user feedback comprises that the first person at least partially takes over control from the assisted-driving system.

15. The computer-implemented method of claim 13, further comprising prompting the first person for the user feedback, wherein the user feedback is received in response to the prompting.

16. The computer-implemented method of claim 12, wherein the second vehicle is being driven by a second person when the driving envelope is provided to the assisted-driving system installed in the second vehicle.

17. The computer-implemented method of claim 1, further comprising receiving context data regarding the first vehicle, the context data pertaining to the first vehicle when the sensor data is generated by the sensors, the context data including quantitative or qualitative exogenous metrics.

18. The computer-implemented method of claim 1, wherein the second vehicle is the first vehicle.

19. The computer-implemented method of claim 1, wherein the assisted-driving system installed in the second vehicle takes an action with regard to the second vehicle, wherein the driving envelope specifies an aspect of the action.

20. The computer-implemented method of claim 19, wherein the assisted-driving system installed in the second vehicle determines, before taking the action, whether to provide the query to the configuration manager before taking the action.

21. The computer-implemented method of claim 20, wherein the assisted-driving system installed in the second vehicle takes into account realtime data about the second vehicle in determining whether to provide the query to the configuration manager before taking the action.

22. The computer-implemented method of claim 1, wherein the assisted-driving system provides at least a first query of the queries before determining whether to take action regarding the second vehicle, and wherein the first query indicates a contemplated maneuver.

23. A computer program product tangibly embodied in a non-transitory storage medium, the computer program product including instructions that when executed cause a processor to perform operations, the operations comprising:
receiving sensor data from sensors of a first vehicle associated with a first person, the sensor data generated by the sensors, wherein the sensor data is received while the first person drives the first vehicle;
applying a machine-learning algorithm to the sensor data to define a driving envelope for an assisted-driving system, the assisted-driving system installed in a second vehicle, wherein the sensor data to which the machine-learning algorithm is applied to define the driving envelope includes sensor data representing one or more events in which the first person takes over control over the vehicle from the assisted-driving system, the driving envelope being defined so as to increase a likelihood that, upon takeover from the assisted-driving system by the first person, the first person does not re-engage the assisted-driving system within a predetermined time; and
providing the driving envelope to the assisted-driving system installed in the second vehicle, wherein the assisted-driving system installed in the second vehicle controls the second vehicle in a continuous manner by repeatedly providing queries to a configuration manager, wherein the driving envelope is continuously provided to the assisted-driving system by the configuration manager in response to the queries, and wherein the assisted-driving system creates a trajectory for the second vehicle using the driving envelope.

* * * * *